United States Patent

[11] 3,567,967

| [72] | Inventors | Benjamin Carmel Fiorino<br>Longmont;<br>Juan Alfonso Rodriguez, Boulder, Colo. |
|---|---|---|
| [21] | Appl. No. | 727,810 |
| [22] | Filed | May 9, 1968 |
| [45] | Patented | Mar. 2, 1971 |
| [73] | Assignee | International Business Machines Corporation<br>Armonk, N.Y. |

[54] VELOCITY DEVIATION DETECTOR
2 Claims, 1 Drawing Fig.

[52] U.S. Cl. .................................................. 307/235,
307/231, 325/478, 328/132
[51] Int. Cl. .................................................. H03k 5/13
[50] Field of Search .......................................... 307/235;
325/478

[56] References Cited
UNITED STATES PATENTS

| 3,252,001 | 5/1966 | Thompson et al. ........... | 307/235 |
| 3,323,066 | 5/1967 | Kurtz .......................... | 325/478 |

Primary Examiner—Donald D. Forrer
Assistant Examiner—L. N. Anagnos
Attorneys—Hanifin and Jancin and J. Jancin, Jr.

ABSTRACT: A velocity deviation detector comprising a variable gain control amplifier, a power driving stage, AC coupling, a squelching network, a low pass filter, and a bidirectional voltage comparator stage. The velocity deviation detector produces an output signal whenever the velocity being measured changes by a percentage value greater than the dictated allowable percentage values as specified by the velocity deviation detector.

$V_3 < V_1$

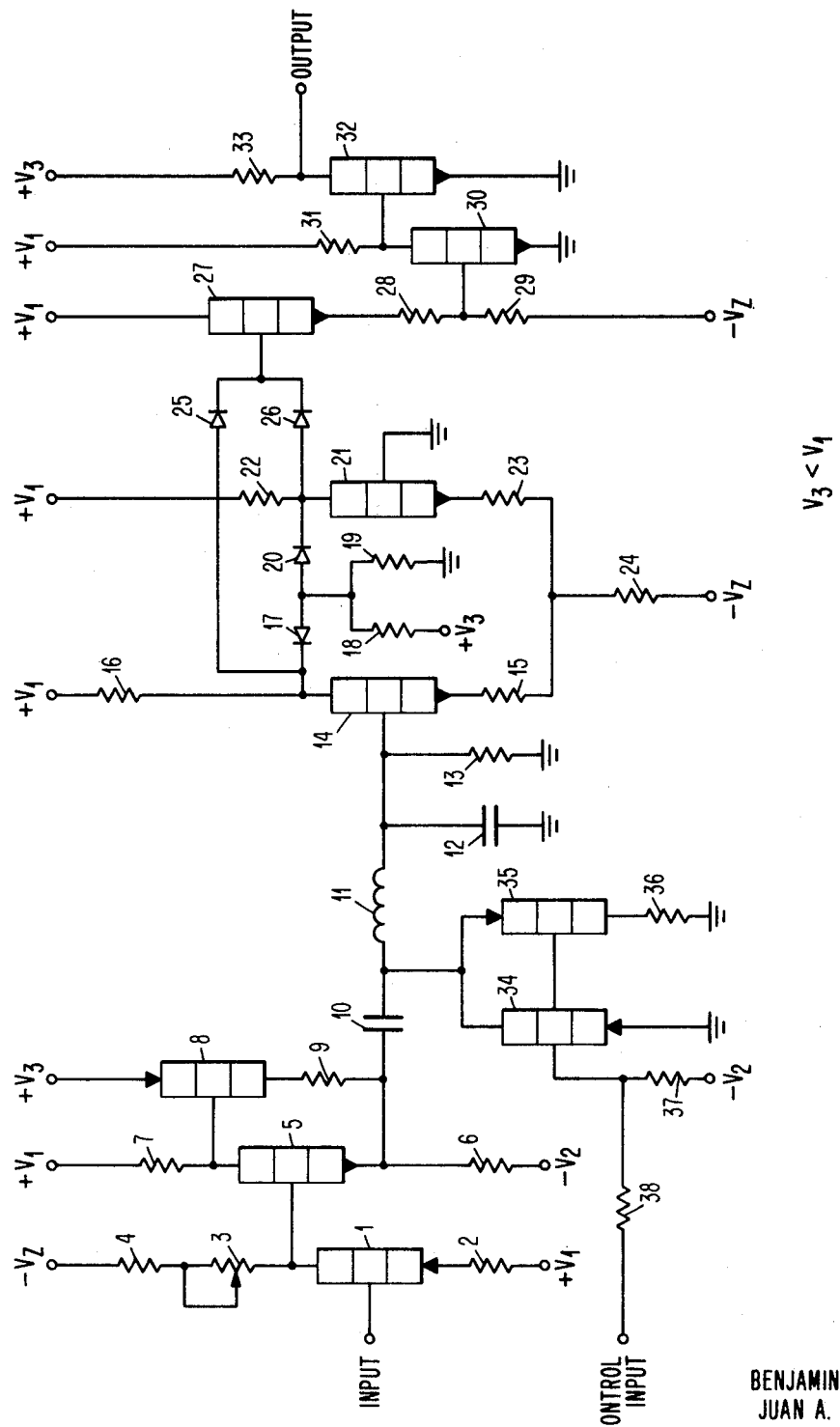
PATENTED MAR 2 1971
3,567,967
INVENTORS
BENJAMIN C. FIORINO
JUAN A. RODRIGUEZ
BY *Carl C. Hanock*
ATTORNEY

VELOCITY DEVIATION DETECTOR

BACKGROUND OF THE INVENTION

1. Field of the Invention

This invention relates to subject matter relating to the measuring, testing or sensing of electrical properties, or the measuring, testing or sensing of nonelectric properties by electric means. More specifically, the invention relates to subject matter for determining when variations of an input signal have exceeded prescribed limits.

2. Description of the Prior Art

With the advent of computing systems, it has become a common practice to store data on magnetic mediums. A problem exists where the magnetic mediums' velocity varies during the time that data is written onto the magnetic medium or where the magnetic mediums' velocity changes while data is being read from the magnetic medium. This shifting in velocity causes errors to be created and therefore false information to be transmitted to the computer associated with the storing apparatus.

One solution to this problem has been the use of a variable frequency clock in a speed controlled system which provides correction for velocity changes during the writing or reading stage from the storage magnetic medium. However, the problem exists that where the velocity change is of a high degree, the variable frequency clock tends to lose synchronization causing a high number of errors to be created. It would therefore be desirous to have a detector that would be sensitive to this large velocity change before the variable frequency clock loses synchronization. The detector would signal the computer that the read or write operation being performed on the magnetic medium should be repeated due to the high probability that the data when read will be in error.

Therefore, an object of the present invention is to provide improved velocity deviation detectors that are sensitive to variations in the velocity being sensed.

A further object of the invention is to provide a new velocity deviation detector for detecting when a change in velocity exceeds a dictated reference for either the velocity increasing or decreasing in speed.

SUMMARY OF THE INVENTION

The invention relates to a velocity deviation detector which detects changes in velocity. The velocity deviation detector has at its input the correction voltage of a variable frequency clock (VFC). The voltage has the unique characteristic of being directly proportional to the output frequency of the variable frequency clock. The output frequency of the variable frequency clock is in synchronism with the main frequency component of the input signal to the clock. Therefore, the correction voltage is directly proportional to the input frequency to the variable frequency clock. The input frequency to the variable frequency clock is dictated by the rate at which data is read from the magnetic medium. Variations in the correction voltage are indicative of variations in the speed at which data is being read or written, that is, changes in velocity of the magnetic medium on which data is stored.

The velocity deviation detector continually monitors the correction voltage for large magnitude deviations in the correction voltage which signify large variations in the velocity of the magnetic medium.

The velocity deviation detector is comprised of a variable gain amplifier, a power driving stage, AC coupling, squelching networks, a low pass filter and a bidirectional voltage comparator stage. The variable gain control amplifier is used to calibrate the voltage deviation detector to the correction voltage associated with the standard input frequency inputted to the variable frequency clock. The variable gain control amplifier therefore allows any variation in the normal magnitude of the correction voltage due to intrinsic component variations within the variable frequency clock to be zeroed out of the velocity deviation detector. The output from the variable gain control amplifier is inputted to a power driving stage for providing a signal to the rest of the velocity deviation detectors. The output of the driving stage is AC coupled to a low pass filter. AC coupling is used to eliminate any DC voltage drift which would otherwise affect the threshold of the bidirectional voltage comparator. The low pass filter is used to attenuate voltage spikes that are superimposed on the correction voltage. These spikes represent unwanted phase information present in the input frequency to the VFC. A squelching network is provided to discharge in the interrecord gap any bias buildup within the AC coupling. This bias buildup would otherwise provide false frequency information to the succeeding record. The output of the low pass filter is fed to a bidirectional voltage comparator stage. The bidirectional voltage comparator stage compares the incoming signal against a maximum and minimum reference such that if the input signal to the bidirectional voltage comparator stage is not within limits an output will be generated from the bidirectional voltage comparator to signal the computer that an alarm condition has been sensed.

BRIEF DESCRIPTION OF THE DRAWING

The foregoing and other objects, features, and advantages of the invention will be apparent from the following more particular description of the preferred embodiment of the invention as illustrated in the accompanying drawing which shows a circuit diagram of the velocity deviation detector of the preferred embodiment of the invention.

DESCRIPTION OF THE PREFERRED EMBODIMENT

FIG. 1 shows a detailed circuit diagram of the preferred embodiment of the invention. The correction voltage from the variable frequency clock is inputted to the base of transistor 1 which operates as a variable gain control amplifier. The variable gain control amplifier is comprised of PNP transistor 1, emitter resistor 2, variable collector resistor 3, and collector resistor 4. Variable collector resistor 3 is set so that the collector voltage of transistor 1 will equal 0 volts when the standard input signal is inputted to the variable frequency clock, which in turn generates the standard correction voltage inputted to the variable gain amplifier. The correction voltage inputted to the variable gain amplifier is then developed across emitter resistor 2. The bidirectional voltage comparator stage is set to detect an exact voltage change at the collector of transistor 1 which corresponds to a change in the quiescent voltage across emitter resistor 2 of the variable gain amplifier. The output of the variable gain amplifier is fed to a power driving stage.

The power driving stage consists of a current amplifier comprised of transistor 5, emitter resistor 6 and collector resistor 7 and a current power amplifier comprised of transistor 8 and collector resistor 9. The output from the variable gain control amplifier is taken from the collector of transistor 1 and inputted to the base of transistor 5 of the current amplifier. The collector of transistor 5 is connected to the base of transistor 8. The emitter of transistor 5 is connected to the collector resistor 9 of transistor 8. The combination of the two current amplifiers forms a power driving stage. The output of the power driving stage is taken from the emitter resistor 6 of transistor 5. The output of the power driving stage is AC coupled to a filter network by means of capacitor 10.

AC coupling is used to prevent any DC voltage drift at the input to the bidirectional voltage comparator stage. The AC coupling network is designed to pass as low a frequency as is practically feasible. It should be here noted that since AC coupling is used so that only the magnitude of the voltage changes occurring on the collector of transistor 1 will be inputted to the filter and ultimately to the bidirectional voltage comparator. It should further be noted that the input frequency to the variable frequency clock increases in frequency, then the correction voltage to the variable gain control amplifier will be a negative correction voltage. This negative going correction voltage will cause a positive voltage to be coupled through the AC coupling capacitor 10. In a similar manner if the input frequency should decrease in frequency then a positive correction voltage will appear on the base of transistor 1 of the variable gain control amplifier, which in turn will cause a negative voltage to be passed by the AC coupling capacitor 10. The magnitude of the positive going or negative voltages passed by the AC coupling capacitor 10 is a function of the magnitude of the change of the correction voltage.

A low pass filter comprised of inductor 11, capacitor 12, and resistor 13 is provided to attenuate voltage spikes of the form $VE^{-at}$ that are superimposed on the correction input signal to transistor 1. These voltage spikes are caused by the phase shift within the inputted signal to variable frequency clock.

A squelching network consisting of transistors 34, 35 and resistors 36, 37 and 38 is provided to discharge a bias buildup condition across the AC coupling capacitor 10. A control signal turns on the squelching network during the time that data is not being read or written on the magnetic medium and provides a low impedance discharge path for the AC coupling capacitor 10 during the time in which the squelching circuit is turned on.

The positive or negative voltages passed by the AC coupling capacitor 10 through the filter are inputted to the bidirectional voltage comparator stage to the base of transistor 14. Transistor 14 with its associated collector resistor 16 and resistors 23 and 24 constitute the circuit for sensing a negative voltage that exceeds the minimum reference value. This is to say that transistor 14 is used to sense a decrease in velocity of the magnetic medium greater than that prescribed by the velocity deviation detector. The voltage divider action of resistors 23 and 24 determines the bias value needed to turn off transistor 14. Transistor 14 being an NPN transistor will turn off when the base of transistor 14 becomes negative with respect to the emitter of transistor 14. Zero current flows through emitter resistor 15 when the bias value of the emitter of transistor 14 is equal to the bias voltage at the node formed by resistors 15, 23 and 24, and therefore, if a negative going pulse is of greater magnitude than the bias on the emitter of transistor 14, transistor 14 will turn off causing the collector voltage of transistor 14 to increase in value.

Transistor 21, resistors 15 and 24 and collector resistor 22 form the circuit for sensing if a positive voltage to the bidirectional voltage comparator is greater than the maximum value set by the bidirectional voltage comparator stage. Here the voltage divider action of resistors 15 and 24 dictates the bias that is needed to turn off transistor 21. In the preferred embodiment of the invention, the base of transistor 21 is connected to ground. If a positive pulse is inputted to transistor 14, transistor 14 will increase in conduction. This increasing current flow will provide a voltage change at the common junction of emitter resistor 15 of transistor 14 and emitter resistor 23 of transistor 21. It can be realized that this voltage change will also be felt on the emitter of transistor 21 via emitter resistor 23. Transistor 21 is an NPN transistor, therefore when the emitter goes positive with respect to the base, transistor 21 will cut off. It again should be noted that the magnitude of a positive voltage necessary to turn off transistor 21 is dictated by the bias value set by the voltage divider action of resistors 15 and 24.

The voltage comparator levels are set as follows: To turn off 14

$$\frac{-V_{BE_{21}} \times R_{24} - V_Z \times R_{23}}{R_{23}+R_{24}} \bigg|_{I_{15}=0} = -v_{in(-)} - V_{BE_{14}}$$

To turn off 21

$$\frac{(+v_{in(+)} - V_{BE_{14}}) \times R_{24} - V_Z R_{15}}{R_{15}+R_{24}} \bigg|_{I_{23}=0} = -V_{BE_{21}}$$

where $v_{in(-)}$ = input signal needed to turn off transistor 14
$v_{in(+)}$ = input signal needed to turn off transistor 21.

A clamping network to each of the collectors of transistors 14 and 21 respectively is formed by diode 17 and diode 20 in conjunction with resistors 18 and 19. The output of transistor 14 is taken via diode 25 and the output of transistor 21 is taken via diode 26.

An OR circuit is made up of diodes 25 and 26 and transistor 27 with emitter resistors 28 and 29. When either transistors 14 and 21 are turned off, a positive voltage will be felt on the base of transistor 27 causing a positive voltage to be felt on the base of transistor 30. An amplifying stage consisting of transistor 30 and collector resistor 31 and transistor 32 and its respective collector resistor 33 are used to provide the final output from the bidirectional comparator stage of the velocity deviation detector.

It should be noted that a zener power supply is used to compensate for power supply variations that may effect the voltage threshold levels established in the bidirectional voltage comparator stage transistors 14 and 21. The initial tolerances of the zener diode power supply are compensated for by the variable resistor 3 and the variable gain control amplifier within the velocity deviation detector. This compensation is done simultaneously with the compensation aforementioned.

OPERATION OF THE PREFERRED EMBODIMENT

To understand the operation of the velocity deviation detector, the velocity deviation detector will be assumed to be in a tape control unit which employs a variable frequency clock. The velocity deviation detector installed within the tape control unit is first calibrated by means of the variable resistor 3 in the variable gain control amplifier to take into account the effects of the zener power supply within the tape drive and the characteristic of the standard correction voltage for the standard input frequency of data that the tape drive should read.

The proper value of the emitter resistor 15 of transistor 14 and the emitter resistor 23 of transistor 21 and common resistor 24 is selected to provide the desired minimum and maximum reference levels. Emitter resistor 23 and resistor 24 dictate the maximum velocity deviation that is allowable with a decreasing velocity. Emitter resistor 15 and resistor 24 dictate the maximum deviation in velocity that is allowed with an increasing velocity. Let it be assumed that a 20 percent deviation is the allowable deviation in either direction of velocity variation.

With a tape drive either writing or reading data and the tape moving at a standard velocity, the input to the variable gain control amplifier will be a standard direction voltage. The standard correction voltage will remain constant as long as the rate at which data is being read from the magnetic medium is not changed. During this time, the voltage at the collector of the transistor 1 of the variable gain control oscillator is 0 volts and transistors 14 and 21 of the bidirectional voltage comparator stage are conducting causing both outputs to be in a down condition which in turn causes the bias value at the emitter of transistor 27 to be below that needed to maintain transistor 30 ON. Therefore, transistor 30 is turned off and transistor 32 is turned on giving a down level at the output of the velocity deviation detector.

Assume that the velocity of the tape drive increases by 25 percent. This would cause a 25 percent decrease in the input correction voltage to the variable gain control amplifier. As previously discussed, this will cause a positive voltage representing a 25 percent change in velocity to be passed by the AC coupling capacitor 10. The positive voltage will be inputted to the base of transistor 14 of the bidirectional voltage comparator stage causing the voltage at the common junction of emitter resistor 15 of transistor 14 and emitter resistor 23 of transistor 21 to also increase by an amount representing a 25 percent increase in the tape velocity. The voltage associated with the 25 percent increase will effectively be felt on the emitter of transistor 21 of the bidirectional voltage comparator stage. Resistors 15 and 24 are set such that any voltage representing a change greater than 20 percent will cause the emitter of transistor 21 to go positive with respect to the base of transistor 21 causing the transistor 21 to turn off. Diodes 17 and 20 clamp the negative swing to prevent saturation of transistors 14 and 21. Specifically diode 17 prevents saturation of transistor 14. Saturation of transistor 14 would load the base bias thereby adversely affecting the threshold voltages. The positive swing of the collector of transistor 21 is inputted via diode 26 to transistor 27. The bias voltage at the base of transistor 27 therefore increases causing transistor 30 to conduct which in turn causes a decrease in current flow through transistor 32 causing a positive rise of the collector voltage of transistor 32. The collector of 32 is the output of the velocity deviation detector and is continually monitored by the computer which recognizes a positive rise to the collector voltage of transistor 32 as a signal that the tape velocity of the tape drive has exceeded the ± 20 percent limit on velocity as dictated by the velocity deviation detector.

In a similar manner, assume that the velocity of the tape within the tape drive for some unknown reason decreases in speed by 25 percent. The variable frequency controlled oscillator will provide an input correction voltage which will increase in value by 25 percent to the variable gain control amplifier. This will cause a negative voltage to be passed by the AC coupling capacitor 10 and inputted to the base of transistor 14 of the bidirectional voltage comparator stage. The amplitude of the negative voltage will represent a 25 percent change in velocity of the magnetic tape within the tape drive. The emitter resistor 23 of transistor 21 together with resistor 24 dictate that when a negative voltage representing a change greater than 20 percent is inputted to the base of transistor 14 that transistor 14 will be cut off. Since this is the case, transistor 14 will be cut off causing the collector of transistor 14 to go positive. The positive going voltage of the collector of transistor 14 is felt on the base of transistor 27 via diode 26 causing the emitter of transistor 27 to follow this positive going voltage. This in turn will cause transistor 30 to be turned on which in turn will cause the current flow in transistor 32 to decrease causing the collector voltage of transistor 32 to go from a ground potential to some positive value. The output of the collector of transistor 32 is the output of the velocity deviation detector and is constantly monitored by the computer which interprets a positive going voltage as an indication that the tape velocity has exceeded the limits dictated by the velocity deviation detector.

It should be noted here that the change in velocity in either a positive or negative direction causes a positive or negative voltage to be inputted to the bidirectional voltage comparator stage of the velocity deviation detector. Therefore, the velocity deviation detector will supply a positive voltage output when the reference level has been exceeded. When the error condition has passed, the bidirectional voltage comparator will return to normal condition, transistor 14 and 21 conducting.

During the interrecord gap time a control signal will turn on the squelching circuit. Transistors 34 and 35 will turn on providing a low impedance discharge path for AC coupling capacitor 10.

It should be realized that in the given example, the limits dictated by emitter resistors 15 and 23 and 24 were chosen to be the same. However, this need not be the case and it is possible by judicially selecting values for resistors 15 and 23 and 24 to obtain any combination of reference percentages that one may desire. For example it may be desired that an increase in speed up to 30 percent may be tolerated whereas only a 20 percent decrease in speed can be tolerated. Therefore, resistors 23 and 24 would set up a 20 percent limit for transistor 14 and resistors 15 and 24 would set up a 30 percent limit for transistor 21. The advantages of this type of operation is that the velocity deviation detector is relatively insensitive to changes in velocity of the tape that is capable of being corrected by the variable frequency clock. It should be remembered that the major purpose of this circuit is to detect situations which will cause the variable frequency clock to lose synchronization and cause additional errors.

The velocity deviation detector may be used for radical correction of the variable frequency clock and to return it back into synchronism. Another use of the invention is to effect a correction in motor speed control circuitry.

While the invention has been particularly shown and described with reference to a preferred embodiment thereof, it would be understood by those skilled in the art that various changes in form and detail may be made therein without departing from the spirit and scope of the invention.

We claim:

1. An apparatus for detecting deviations of velocity, where the input to said apparatus is a correction voltage linearly proportional to the velocity being monitored, comprising:
    a variable gain control amplifier containing means for calibrating said apparatus to eliminate errors due to the source of the correction voltage, the input to said variable gain control amplifier being the correction voltage;
    a power driving stage comprising a current amplifier and a power current amplifier coupled in cascade, said cascading and current amplifiers coacting to provide an output signal from said power driving stage, the input to said power driving stage being the output from said variable gain control amplifier;
    an AC coupling capacitor for passing the AC components of said output signal from said power driving stage;
    a squelching network to provide a low impedance discharge path for said AC coupling capacitor to prevent a bias buildup condition across said AC coupling capacitor, said squelching network being selectively activated;
    a low pass filter for filtering undesired AC components existing in the output signal passed by said AC coupling capacitor;
    a bidirectional voltage comparator stage, the input to said bidirectional voltage comparator stage being the output of said low pass filter, said bidirectional voltage comparator stage comprising:
        a reference means for establishing a positive and negative reference for said bidirectional voltage comparator stage;
        a comparing means for comparing the input to said bidirectional voltage comparator stage against said reference means;
        an output signal generating means for generating an output signal whenever the input to said bidirectional voltage comparator stage is outside of the references established by said reference means; and
    said output from said bidirectional voltage comparator stage being the output from said apparatus.

2. An apparatus for detecting deviations of an input signal to said apparatus, comprising:
    an input amplifier for monitoring the input signal;
    an AC coupling means for AC coupling the output from said input amplifier to a bidirectional voltage comparator;
    a bidirectional voltage comparator having means for establishing a minimum and maximum reference, said bidirectional voltage comparator stage comparing the output from said input amplifier against said minimum and maximum references to determine if the correction voltage being monitored by said input amplifier is within the boundaries dictated by said minimum and maximum references, said bidirectional voltage comparator stage generating an output signal whenever said voltage is outside the boundaries dictated by the minimum and maximum references; and
    a squelching network to provide a low impedance discharge path for said AC coupling means to prevent a bias buildup condition across said AC coupling means, said squelching network being selectively activated.